Dec. 25, 1951     G. H. NORQUIST     2,579,753
PUNCHING AND FORMING MECHANISM
Filed Nov. 28, 1944     5 Sheets-Sheet 1
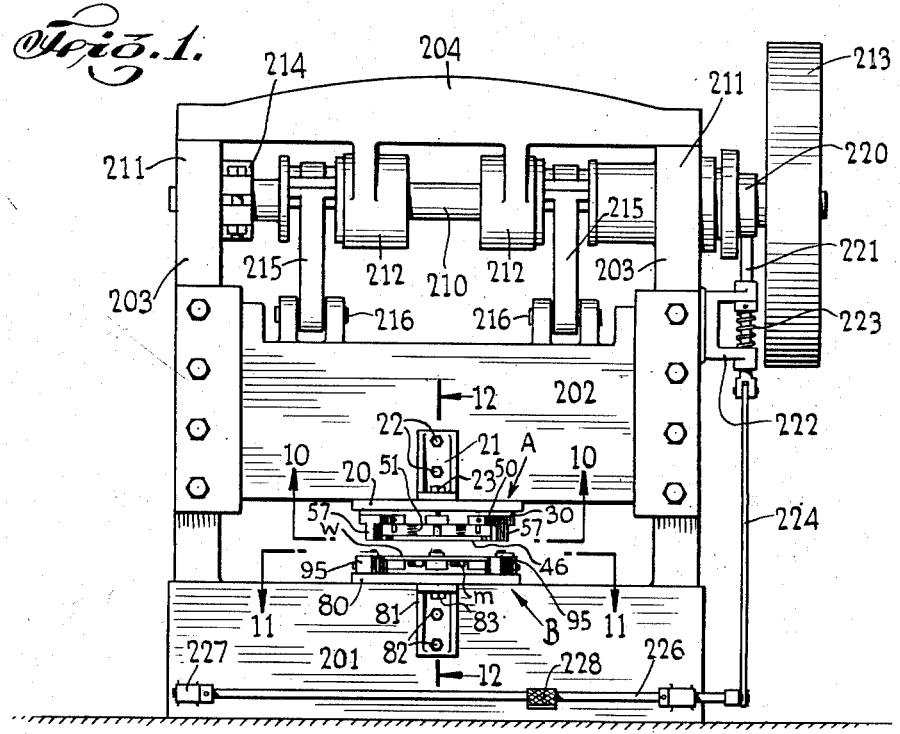
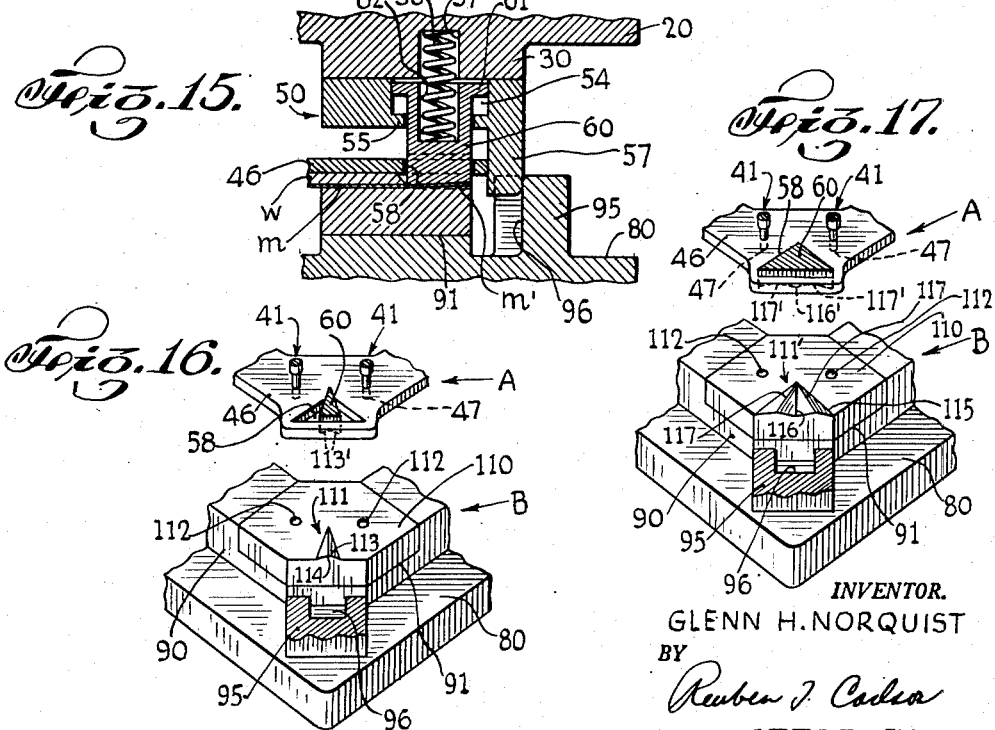
INVENTOR.
GLENN H. NORQUIST
BY
ATTORNEY

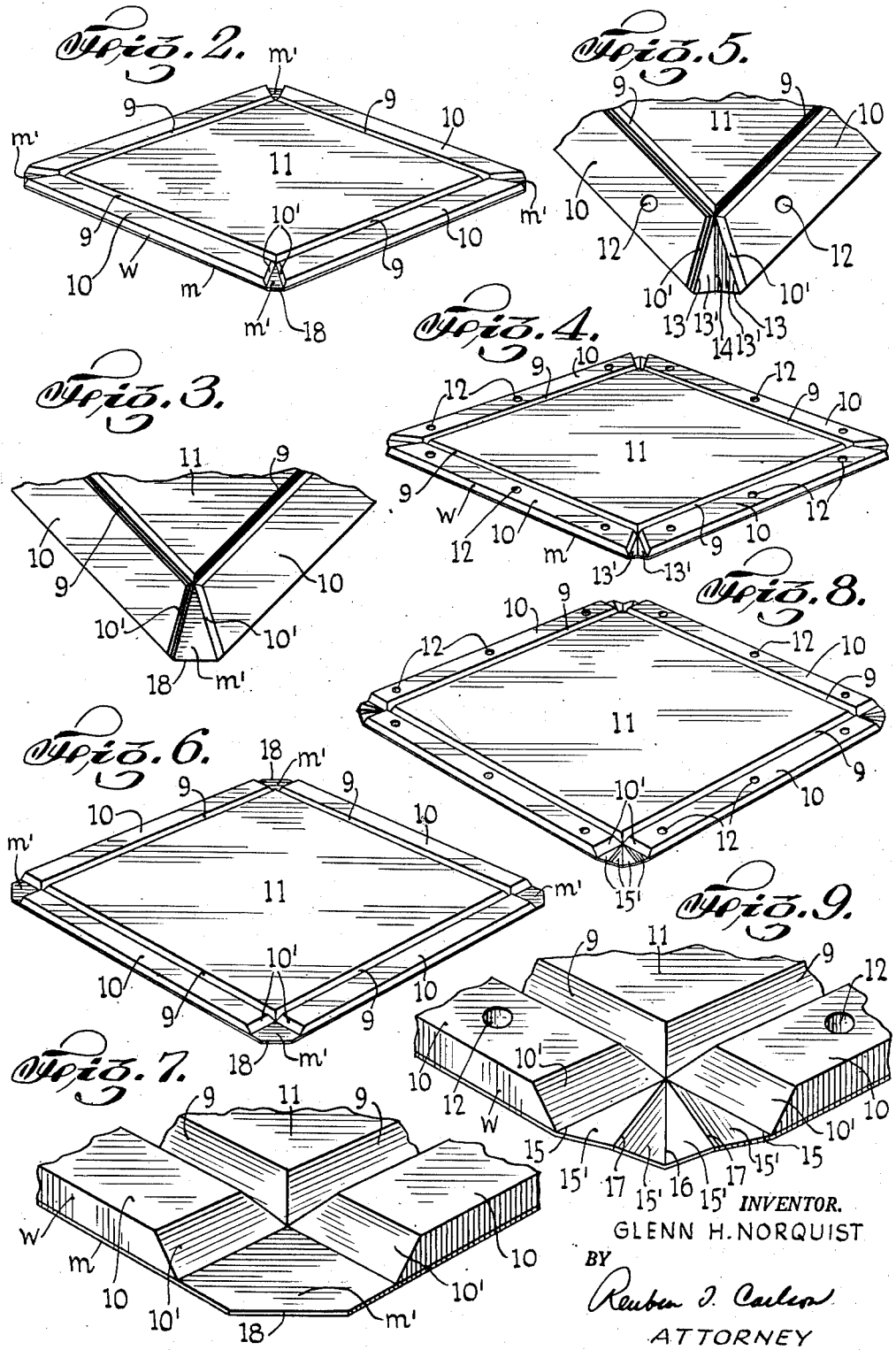

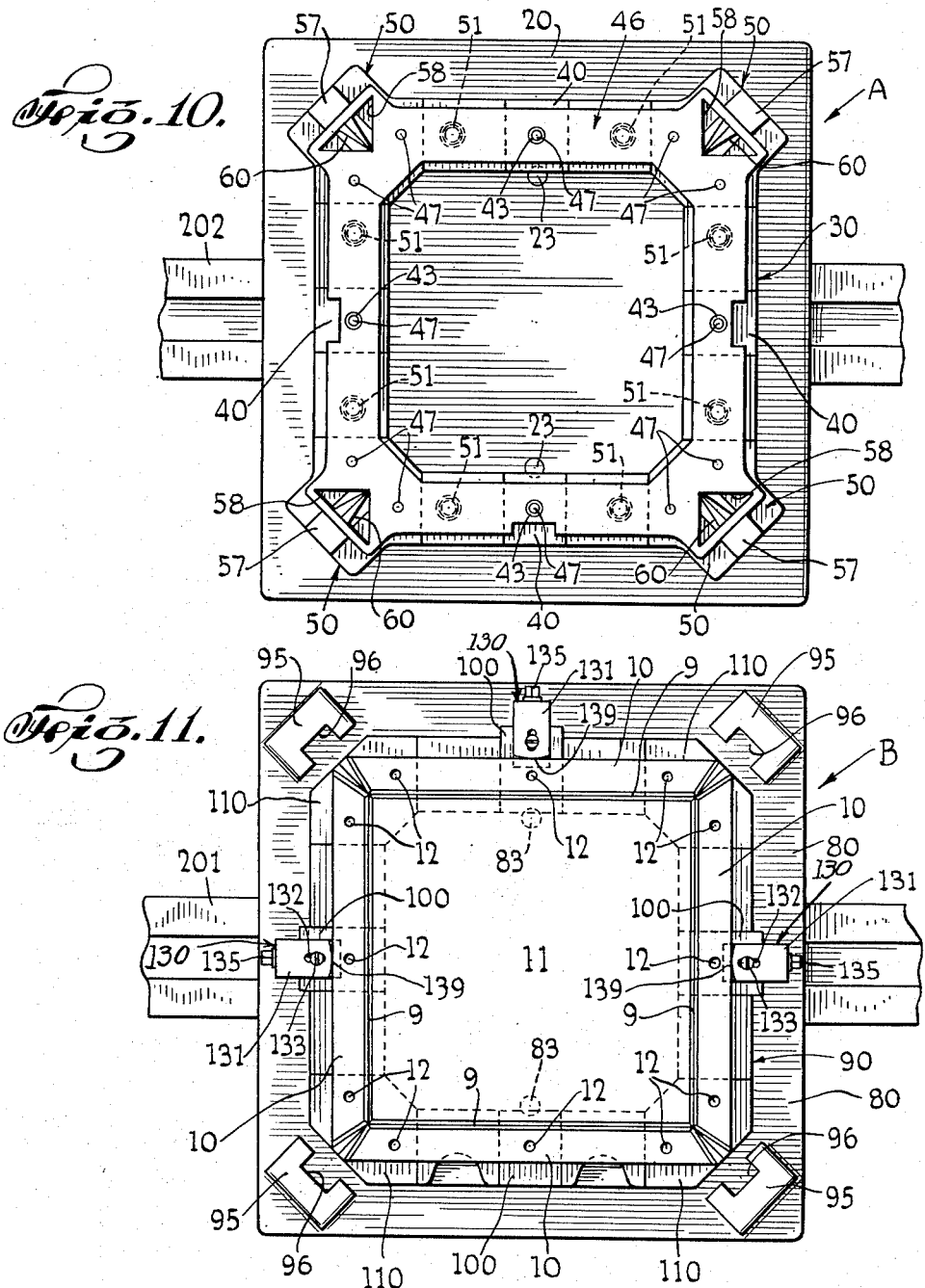

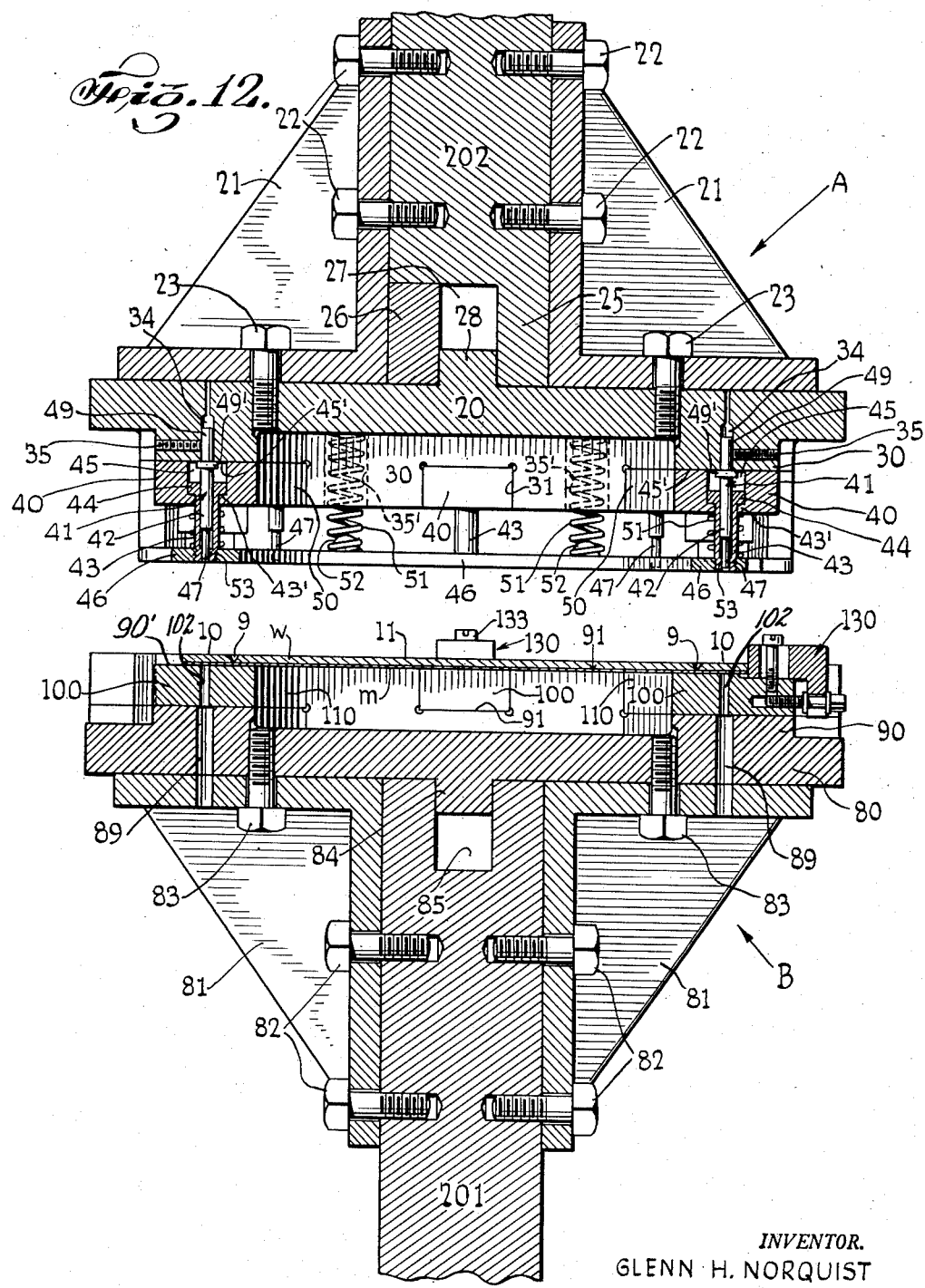

Dec. 25, 1951 G. H. NORQUIST 2,579,753
PUNCHING AND FORMING MECHANISM
Filed Nov. 28, 1944 5 Sheets-Sheet 5

INVENTOR.
GLENN H. NORQUIST
BY
Reuben J. Carlson
ATTORNEY

Patented Dec. 25, 1951

2,579,753

UNITED STATES PATENT OFFICE 2,579,753

PUNCHING AND FORMING MECHANISM

Glenn H. Norquist, Jamestown, N. Y.

Application November 28, 1944, Serial No. 565,525

3 Claims. (Cl. 153—21)

This invention relates to punching and forming mechanism, and more particularly to an improved mechanism for punching and crimping metal-clad panels.

Metal-clad panels, comprising a base sheet formed of wood, ply-wood, fibre board or other base material having a metal sheet secured to one side thereof, possess qualities which make them highly adapted and useful for fabrication into table tops, shelving, cabinets, counters, packing cases, and like products. In the fabrication of such products from metal-lad panels, it is often necessary to form holes therein which extend through the base sheet and the metal sheet of the panel, and to also form crimps or fold lines in the metal sheet of the panel, which crimps form panel reinforcing ribs when the panel has been shaped or flanged to the contour required by the finished product to be made.

Heretofore, it has been considered impossible to form punch holes or openings which extend through both the base sheet and metal sheet in a single operation. It has heretofore been customary to punch the necessary holes in the metal sheet and the base sheet separately and before they are bonded or cemented together. Such operations require careful layout work, to thereby insure that the holes formed in the base sheet and the metal sheet will be properly located and aligned when the base sheet and the metal sheet have been cemented together. Furthermore, it has been considered necessary to employ a different type of punch or cutting tool for the metal sheet and for the base sheet, and more particularly so where the base sheet is formed of wood or laminated plywood.

Attempts have also been made to form holes in a metal-clad panel by the use of a rotating drill. These drilling operations are difficult and time-consuming to perform, since the drill tends to heat up, does not drill straight, and the drill requires frequent sharpening. Further, the drill tends to tear the edge of the metal hole and forms metal burrs around the hole which must be ground or filed off.

Where crimps or folds are to be formed in the metal sheet, such crimps or folds have heretofore been performed in operations separate from the punching or drilling operations, and have required careful layout work and skillful operators to insure accurate location and formation of the crimps or folds. Even though a high degree of craftsmanship and care is exercised, it has been found that after completion of all these operations, the holes and crimps formed in many of the panels operated upon are not in alignment or are otherwise inaccurately located, with the result that many of the panels must be discarded.

In accordance with this invention, mechanism is provided which may be attached to a mechanical power press, whereby accurately formed and located punch holes and cutouts may be formed in the metal-clad panel in a single operation by a relatively untrained operator and at high production speed. This improved mechanism has provision for association therewith of metal crimping devices whereby all the necessary crimps and folds may be formed in the metal sheet simultaneously during the punching operation.

This improved punching and forming mechanism comprises a lower unit adapted to be attached to the fixed bed member of the press and an upper complementary unit adapted for attachment to and manipulation by the reciprocating member of the press. Both the lower and upper units have cooperating complementary devices associated therewith, operative to simultaneously punch holes or openings with accuracy and precision through both the base sheet and the metal sheet of the metal-clad panel, and to simultaneously crimp selected areas of the metal sheet with accuracy and precision. Means are provided which permit the operator to quickly locate the metal-clad panel in proper operative position and yet permit unobstructed removal of the panel operated upon. The mechanism has the further advantage of being relatively simple in design, with relatively few moving parts, is sturdy and lasting in construction, is substantially self-sharpening and can be associated with almost any convenient type of power press whose reciprocating member is under the control of the operator. A relatively unskilled operator can operate the mechanism and punch and form several hundred panels per hour, with accuracy and precision, and substantially without loss of any of the panels by reason of inaccurate workmanship.

An object of this invention is to provide an improved mechanism for punching openings or holes through metal-clad panels with precision and accuracy, with minimum of labor and at low cost.

Another object of this invention is to provide an improved automatic mechanism adapted to operate upon metal-clad panels and punch one or more pre-determined accurately located holes therein which extend through both base sheet and the metal sheet of the panel; and to simultaneously crimp the metal sheet in the form to permit subsequent accurate folding thereof.

A further object of this invention is to provide an improved mechanism adapted for attachment to a mechanical press and operative to punch and crimp metal-clad panels which is strong and sturdy in construction, simple and foolproof in operation, and which is adapted to punch and crimp metal-clad panels with precision and accuracy and at high production speeds.

A further object of this invention is to provide an improved high-speed method for punching and crimping metal-clad panels.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Fig. 1 is a diagrammatic front elevational view of a mechanically operated press having the improved punching and forming attachments associated therewith;

Fig. 2 is a perspective view of a metal-clad panel as it appears prior to punching and forming;

Fig. 3 is an enlarged fragmentary top plan view of a corner portion of the metal-clad panel shown in Fig. 2 prior to punching and forming;

Fig. 4 is a perspective view of the metal-clad panel as it appears after having been punched and formed by the improved punching and forming attachments constituting the subject matter of this invention;

Fig. 5 is a fragmentary top elevational view of a corner portion of the punched and formed metal-clad panel shown in Fig. 4;

Fig. 6 is a perspective view of a metal-clad panel having corners of somewhat modified formation adapted to be punched and formed by the improved punching and forming attachments constructed in accordance with this invention;

Fig. 7 is a fragmentary perspective view of a corner portion of the metal-clad panel illustrated in Fig. 6;

Fig. 8 is a perspective view of the metal-clad panel shown in Fig. 6 after punching and forming;

Fig. 9 is a fragmentary perspective view of a corner portion of the punched and formed metal-clad panel shown in Fig. 8;

Fig. 10 is a bottom plan view of the upper punching and forming unit attached to the reciprocating member of a punch press as the same appears when viewed along line 10—10 of Fig. 1;

Fig. 11 is a top plan view of the lower punching and forming unit attached to the fixed bed member of a punch press as the same appears when viewed along line 11—11 of Fig. 1;

Fig. 12 is a vertical cross-sectional view of the upper and lower units as affixed respectively to the reciprocating member and the fixed member of the mechanical press as the same appears when viewed along line 12—12 of Fig. 1, the upper and lower punching and forming units being shown separated, with a metal-clad panel resting upon the lower unit in position to be operated upon;

Fig. 15 is an enlarged fragmentary cross-sectional view of the upper and lower corner forming and shaping die members as the same would appear when viewed along a vertical plane taken through one of the corners of the upper section shown in Fig. 10 and the lower section shown in Fig. 11;

Fig. 16 is a fragmentary perspective view of the stripper plate, and the upper and lower corner forming die members of a type designed to crimp the metal sheet into the form shown in Fig. 5; and Fig. 17 is a fragmentary perspective view of the stripper plate and the upper and lower corner forming die members adapted to crimp the corner metal into the form shown in Fig. 9.

Similar reference characters refer to similar parts throughout in the specification and drawings.

Figure 13:
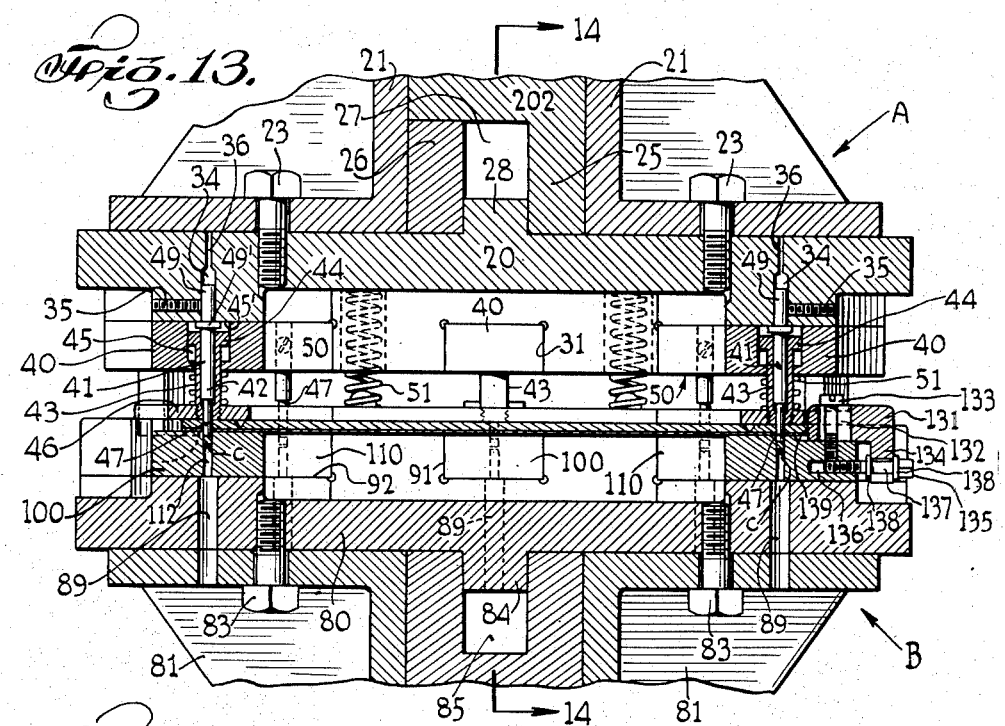
Fig. 13 is an enlarged vertical cross-sectional view of the mechanism similar to that shown in Fig. 12, showing the upper unit moved into position for punching and forming the metal-clad panel resting upon the lower unit.

In accordance with this invention, a punching and forming mechanism is provided adapted to punch any desired number and size of holes or perforations in metal-clad panels, and at the same time to crimp and shape the corner sections of the metal sheet into such form as to permit uniform folding thereof in subsequent operations. The mechanism comprises an upper unit A which cooperates with a lower unit B adapted to be attached to almost any form of mechanical press. There is shown in Fig. 1, for purpose of illustration only, a diagrammatic form of a press with which the units may be associated, said press having essentially a fixed bed block 201 to which the lower unit B of the mechanism may be attached and a reciprocating member 202 to which the upper unit is attached.

In order to more fully understand the construction and operation of the improved punching and forming mechanism which constitutes the subject matter of this invention, the metal-clad panel to be operated upon will first be described and explained.

The metal-clad panel, as shown in Figs. 2 and 3 to be operated upon, comprises essentially a base sheet $w$ having a metal sheet $m$ firmly and permanently cemented to one side thereof. The base sheet $w$ is in many instances formed from a plurality of superposed thin layers of wood or veneer firmly bonded together by a suitable cement. Such metal-clad panels possess great strength and are adapted for numerous and various uses after begin processed to the desired shape and form. In the manufacture of numerous products, such metal-clad panels must be flanged and provided with holes through which rivets, eyelets or bolts may be inserted. The metal-clad panel to be operated on is provided with grooves 9 which substantially sever the flange section 10 from the main section 11 of the base sheet $w$. The adjacent ends 10' of the base sheet are cut on a bevel exposing a section $m'$ of the corner metal. In subsequent operations, the flanged sections 10 are raised to extend at an angle to the main section 11 of the panel in which position the free ends 10' of adjacent flanged sections will extend in approximately parallel relationship. The exposed corner sections $m'$ of the metal sheet must first be crimped to initiate the bending thereof into a rib, which rib will be wedged between the adjacent ends 10' of the flanged sections 10 when the flanged sections have been bent to the desired angle with respect to the main section 11.

The improved punching and forming mechanism comprising the subject matter of this invention is designed to punch and form a series of spaced holes 12 which extend through both the base sheet $w$ and the metal sheet $m$, and during the same operation, to crimp the corner metal in such form as will insure natural bending thereof into a rib formation in a subsequent processing operation. Thus the punched and formed panel as shown in Figs. 4 and 5 has the corner sections $m'$ of the metal sheet folded along the exterior fold lines 13 and along an intermediate line 14 to form triangular shaped segments 13', the medial fold line 14 forming in effect a raised ridge. The metal-clad panel, as shown in Fig. 4, is designed to be formed in later operations into a flanged panel in which the flanged sections 10 are raised at an angle of approximately 45° to the plane of the main section 11, with the triangular segments 13' folded together in parallel relationship to provide a reinforcing rib which is wedged between the adjacent ends 10' of the flanged sections 10 of the base sheet.

The metal-clad panel as shown in Figs. 6 and 7 has been prepared for formation into a flanged panel in which the flanged sections 10 thereof extend at approximately an angle of 90° to the plane of the main section 11. In this arrangement the adjacent ends 10' of the flanged sections 10 of the base sheet extend at approximately an angle of 90° to one another, leaving a relatively square cornered section $m'$ of the metal sheet exposed. By providing the forming mechanism with properly shaped dies, the corner metal as shown in Fig. 7 may be shaped into the form shown in Fig. 9 whereby the corner metal is provided with the exterior fold lines 15, a medial fold line 16, and a pair of intermediate fold lines 17, thereby dividing the metal corner section into four somewhat similar shaped triangular segments 15'. It will be noted that the exterior fold lines 15 and the medial fold line 16 lie in approximately the same plane, whereas the intermediate fold lines 17 lie in a raised plane so as to form raised ridges in the corner metal. When the flanged sections 10 of the panel shown in Fig. 8 are bent to extend approximately at 90° angle to the plane of the main section 11, the adjacent ends 10' of the flanged sections of the base sheet will extend approximately in parallelism, and the corner metal will be folded so that the segments 15' thereof will extend substantially in parallelism and be wedged between the adjacent ends 10' of the flanged section 10 of the base sheet, so as to provide in effect a four-ply metal reinforcing rib at the corner of the flanged panel.

The improved punching and forming mechanism constituting this invention is particularly designed to operate upon metal-clad panels of the type above described, and to punch any desired number of spaced holes 12 through the metal-clad panel at exact, predetermined locations and to simultaneously crimp the exposed corner metal in such form that it can be folded in a predetermined manner in subsequent operations. The operations performed by this improved mechanism constitute important steps in the manufacture of flanged metal-clad panels, and the improved mechanism herein described permits such necessary punching and corner forming operations to be performed precisely and accurately and at high production speeds.

The upper unit A of the punching and forming mechanism, as shown and illustrated in detail in Figs. 10, 12, 13 and 14, comprises more particularly a heavy pressure plate 20, which extends horizontally across the lower edge of the reciprocating member 202 of the press and is secured thereto by suitable angle bracket 21. Bolts 22 connecting one leg of the bracket to the member 202 and bolts 23 connect the horizontally extending leg to the pressure plate 20. The pressure plate 20 is carefully centered with respect to the press member 202 by means of a stud 25 which projects upwardly from the center of the pressure plate 20 and abuts a downwardly extending flange 25 of the press member 202. A removable bar 26 abuts the projection 28 of the pressure plate 20, the bar 26 being secured to the press member 202 by means of suitable bolts.

The pressure plate 20 is provided with a circumferentially extending punch block 30, which has a circumferential contour similar to the metal-clad panel to be operated upon. The punch block 30 may be integrally formed with the pressure plate 20 and extends downwardly therefrom. The punch block 30 carries and supports the punch pins 41. To facilitate mounting of the punch pins 41, the punch block 30 may be provided with spaced cutouts 31, each shaped to snugly receive an intermediate punch block section 40. The corners of the circumferentially extending punch block 30 may also be cut out to receive a corner punch block section 50.

Each punch block section 40 is designed to support one or more hole punching devices, such as the punch pin 41. Each punch pin has a stem section 42, which telescopes within a tubular sleeve member 43. The sleeve member 43 is provided with a head portion 44, which is designed to telescope snugly within a receiving cavity 45 provided in the punch block section 40. The sleeve member 43 thus has a limited telescoping movement within the punch block section 40. The lower end of the sleeve member 43 is provided with a threaded end portion, and is thereby secured to a threaded hole 53 in stripper plate 46, whose function will be more fully described hereinafter. Each punch pin 41 is provided with a punch point 47, which extends through a guide opening in the threaded end portion of the sleeve member 43, the punch point 47 having a size and diameter which will form the desired size of punch opening in the metal-clad panel operated upon. The upper end portion 49 of the punch pin extends into a receiving opening 34, formed in the punch block 30 and pressure plate 20. A set screw 35, threaded laterally into the punch block 30, may be provided to releasedly retain the punch pin in fixed position. The punch pin is also provided with a shoulder portion 49' adapted to abut against the upper wall 45' of the receiving cavity 45, so that the downward force exerted by the pressure plate 20 is transmitted to the punch pin 41 and its associated punch point 47.

Figure 14:
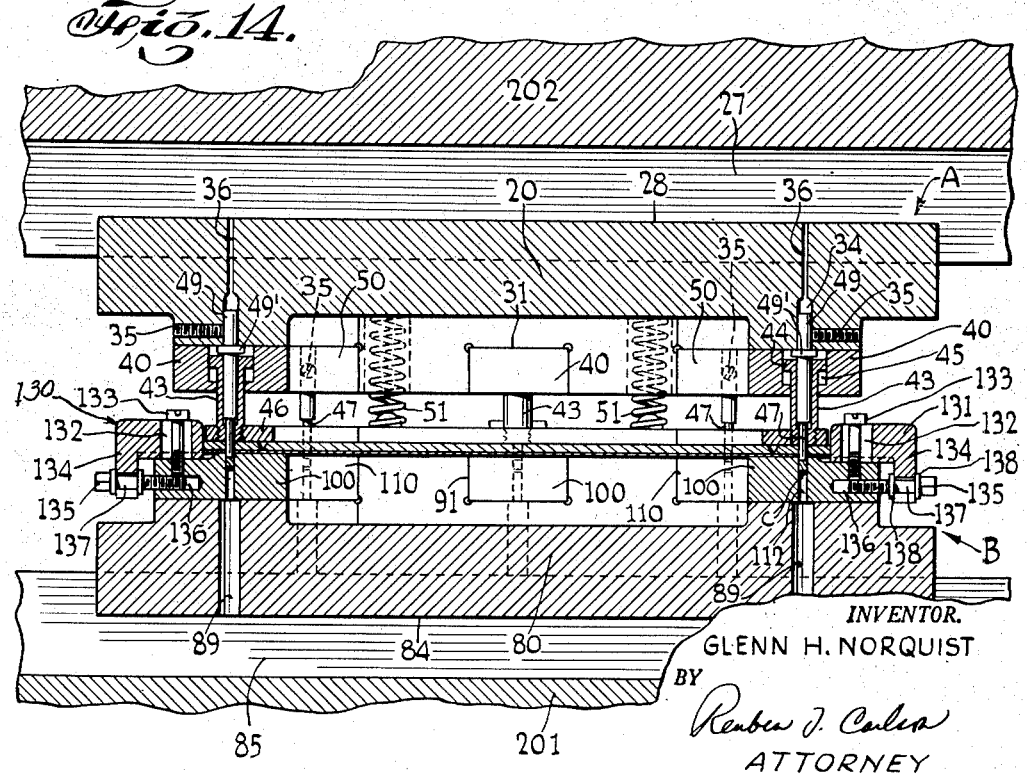
Fig. 14 is a longitudinal cross-sectional view through the mechanism as the same appears when in punching and forming position and as viewed along line 14—14 of Fig. 13.

It will be noted by referring more particularly to Figs. 10, 13 and 14, that the pressure plate 20 is shown equipped with four intermediate punch block sections having associated therewith a punch pin 41 and sleeve member 43. It will be appreciated, however, that the punch pins 41 and sleeve members 43 may be mounted directly to the main punch block 30, or as shown, as many punch block sections 40 may be provided as desired, and it will be further appreciated that the punch block 30 or the punch block sections 40 may carry as many punch pins as desired. Each punch block section 40 may be retained in the receiving notch 31, provided for it, by any suitable means such as machine bolts or locking keys (not shown).

It will be further appreciated that the stripper plate 46 is supported from the ends of the sleeve members 43 and that in normal position, as shown in Fig. 12, the head portion 44 of each sleeve member 43 rests upon the shoulder 43' which defines the lower wall of a cavity 45 provided in the punch block section 40. The stripper plate 46 is retained in downward extended position by means of a series of spaced compression springs 51, whose upper ends extend into a guide cavity 35', formed in the punch block 30. The lower end of the compression spring 51 is secured to a suitable projection 52, extending upwardly from the stripper plate 46. It will be appreciated that the stripper plate 46 is made continuous in the form of a rim positioned directly below the punch block 30 and may be made of slightly less width than the boss portion 30. The stripper plate is also provided with a hole 53 for each punch-point 47, the holes 53 arranged so that the punch points 47 may freely telescope therethrough.

The corner block sections 50, which are set in the corner receiving cavities of the punch block 30, are designed to support one or more punching pins 41 as above described, and in addition to support a crimping die 60, as shown in particular in Fig. 15. Each corner block section 50, as shown in Fig. 10, is equipped with two punch pins 41 designed to punch two holes through the corner of the panel operated upon. Each corner pin 41 comprises a stem section 42 having a punch point 47 adapted to project through an aligned hole in the stripper plate 46. The upper end portion of each corner punch pin 41 extends into a receiving opening formed in the corner block section 50 and is releasedly retained therein by a set screw 35. The downward force exerted by the pressure plate 20 is transmitted to the punch pins 41, supported by the corner block sections 50.

In addition to the punching devices above described, each corner punch block section 50 is provided with a cavity 54, which receives a crimping die 60. The crimping die 60 is provided with a head portion 61, adapted to snugly telescope within the cavity 54. The floor of the cavity 54 is formed by an inward extending flange 55, defining an opening through which the body of the crimping die 60 extends. The lower die face of the crimping die 60 is shaped in conformity with the upper surface of the crimp to be formed in the corner metal m' to be shaped. A compression spring 56 serves to exert downward pressure on the crimping die 60, so that the collar portion 61 of the crimping die will normally seat on the inturned flange portion 55, which forms the floor of the cavity 54. The compression spring 56 is arranged so that the lower end thereof seats within a cavity 62, formed in the upper end of the crimping die 60, with the upper end portion of the spring seating within a cavity 37 formed in the punch block 30. Each of the corner punch block sections 50 is also provided with a downward extending lug 57, which cooperates with an upstanding guide lug 95, projecting upwardly from the lower punching and forming unit B, hereinafter to be described. As shown more particularly in Fig. 16, the stripper plate 46, is provided with a cut-out opening 58, in the corner thereof, through which the lower portion of the crimping die 60 projects.

It is now seen that the upper unit A of the punching and forming mechanism, comprises essentially a pressure plate 20, having a downwardly projecting punch block 30, which may conveniently be provided with notches arranged to snugly receive and retain the intermediate punch block sections 40 and the corner punch block sections 50. Each of the intermediate punch block sections 40 and the corner punch block sections 50 are equipped to support one or more punch pins 41, which are retained in fixed positions by set screws 35. The stem section 42 of each intermediate punch pin 41 extends through a guide sleeve 43, the lower end of which is threaded and secured to the stripper plate 46. The intermediate punch block sections 40 are each provided with a cavity 45 of the same size and depth into which the head portion 44 and the sleeve member 42 is permitted to telescope to a limited extent. Each head portion normally seats upon the end wall 43' of its cavity and is thus retained by the spaced compression springs 51, as shown more particularly in Fig. 12. However, when the stripper plate 46 is pressed against the panel to be operated upon by the pressure plate 20, against the action of the compression springs 51, the head portions 44 of the sleeve members 43 will move upwardly in their respective punch block cavities 45, and since the punch points 47 are held in fixed position, the punch points 47 of the intermediate punch pins 41 will telescope through the threaded holes 53, and the punch points 47 of the corner punch pins 41 will telescope through the corner holes 53' provided therefor in the stripper plate 46, and the lower die form of the crimping dies 60 will also project through the openings 58 provided in the stripper plate 46.

The lower unit B of the punching and forming mechanism is designed to cooperate with the upper unit A above described. The lower unit comprises more particularly a fixed base plate 80, which extends horizontally across and is supported by the fixed bed block 201 of the press. The fixed base plate 80 may be secured to the fixed bedblock 201 of the press, as shown in the lower half of Fig. 12, by means of angle brackets 81, having the vertical leg thereof secured to the bed block 201 as by bolts 82, and the horizontal leg thereof secured in the fixed base plate 80, as by bolts 83. The base plate 80 is carefully centered with respect to the bed block 201 by means of a stud 84, which projects downward therefrom into a receiving slot 85, formed in the upper end of the bed block 201 of the press.

The fixed base plate 80 is provided with an upwardly projecting and circumferentially extending die block 90, having a contour similar to the punch block 30 of the upper unit A, above described. The die block 90 has a flat upper surface 90', which provides a flat support for the metal-clad panel to be operated upon. For convenience in assembly, intermediate notches 91 may be provided in the die block 90, shaped to snugly receive intermediate die block sections 100, and corner notches 92 may also be conveniently formed in the die block 90 to snugly receive the corner die block sections 110. The intermediate die block sections 100 and the corner die block sections 110 are retained in their respective receiving notches 91 and 92, by any suitable means such as bolts or locking keys (not shown). The upper surfaces of the intermediate die block sections 100 and the upper surfaces of the corner die block sections 110, are set so as to extend flush with the upper surface 90' of the die block 90, as shown more particularly in Figs. 12 and 14.

Each of the lower intermediate die block sections 100 is provided with a die hole 102 therein, which is in accurate alignment with the punch point 47 of the punch pin 41, carried by the complementary upper punch block section 40. Each of the corner die block sections 110 is also provided with a punch hole 112, in accurate alignment with the punch point 47 of the punch pin 41, carried by the upper complementary corner punch block section 50. The fixed base plate 80 has an enlarged hole 89 formed therein in alignment with each of the die holes 102 and 112 in the die block sections 100 and 110, thereby providing an escape passage for the slug of material c punched out of the metal-clad panel operated upon.

As shown more particularly in Figs. 11 and 16, a guide lug 95 is positioned at each corner of the die block 90 and may be formed integral therewith. Each guide lug 95 may be provided with a guide cavity 96 into which a lug 57, associated with the companion upper punch block sections 50 may extend, as shown more particularly in Fig. 15. Thus the female guide lugs 95 and the male guide lugs 57 provide a means for insuring accurate registry of the upper corner punch block sections 50 with the lower corner die block sections 110.

In event the corner metal of the panel to be operated upon is to be crimped in the form shown in Fig. 5, a male die form 111 is accurately formed on the upper surface of the lower corner die block section 110. The male die from 111 as shown in Fig. 16 is provided with a ridge 114 to form the intermediate fold line 14 in the corner metal $m'$, the faces 113 being shaped to form the faces 13' of the corner metal. The crimping die 60 associated with the upper corner punch block section 50 has a die face as shown more particularly in the upper half of Fig. 16, and is provided with inclined forming faces 113' complementary to the inclined forming faces 113 of the male die form 111. Thus, it will be appreciated that when the die form of the crimping die 60 is brought down over the male die form 111, corner metal pressed therebetween will be formed and shaped as illustrated in Fig. 5.

The lower corner die block section 110 shown in Fig. 17 is provided with a male die form 111' which is shaped to form the corner metal into the form illustrated in Fig. 9, and is provided with raised ridge lines 117 and intermediate depressed ridge line 116, which form the fold lines 17 and 16 in the corner metal. The lower end of the crimping die 60, as shown in the upper part of Fig. 17, extends through the opening 58 in the stripper plate 46 and is provided with complementary folding ridge lines 116' and 117'. Thus when the die faces of the crimping die 60 and the die form 111' as shown in Fig. 17, are brought together with the corner metal pressed therebetween, the corner metal will be crimped to provide the spaced triangular segments 15' and the intermediate triangular segments 15' as shown in Fig. 9.

The metal-clad panel to be punched and crimped is positioned so that the metal face thereof lies flat upon the top face 90' of the die block 90. A plurality of adjustable guide elements 130 may be provided to accurately center the panel to be operated upon, three guide elements being shown in Figs. 11 and 14. Each of these guide elements may comprise a heavy angular shaped member, having a horizontal leg 131, resting upon the lower intermediate die block segment 100. An elongated slot 132 may be provided in the horizontal leg 131, through which a securing bolt 133 may extend, the securing bolt 133 being threaded into the lower intermediate die block segment 100. The downward extending leg 134 of the guide element 130, carries a threaded adjusting screw 135, which may be threaded into a lateral extended threaded hole 136 in the lower intermediate die block segment 100. The adjusting screw 135 has a neck portion 137, which extends through an opening in the downward extending leg 134. The adjusting bolt 135 is also provided with collar portions 138, to firmly secure the leg 134 to the adjusting bolt 135. By manipulating the adjusting bolt 135, it will be noted that the rounded edge 139 of the horizontal leg 131 may be adjusted into position and then fixed in this position by the set bolt 133. Thus it will be appreciated that the guide edges 139 of the guide elements 130 may be accurately adjusted, so as to snugly receive the panel therebetween and thus assure accurate registry of the panel to be operated upon. In most operations a considerable number of panels of the same size are to be punched and crimped, so that once the guide elements 130 have been adjusted and set, no further adjustment thereof need be made. If a panel of different size is to be formed, it is likely that the upper punch block segments 40 and the lower complementary die block segments 100, as well as the upper corner punch block segments 50 and the lower complementary corner die block segments 110 may have to be changed. If the panels to be operated upon are substantially different in size and shape from the panels previously operated upon, complementary upper and lower units A and B formed to fit the panels to be operated upon may be attached to the press.

The upper unit A of the mechanism, as shown in Fig. 1, is attached to the reciprocating member 202 of a mechanical press, which comprises a pair of spaced upright standards 203, which rest upon the base block 201 of the press, the standards being connected at their upper ends by a yoke frame 204. The press member 202 is arranged to reciprocate between the standards 203. Power means for reciprocating the press member 202 may comprise a crankshaft 210, journaled in bearings 211 associated with the supporting standards 203, and a pair of center bearings 212 supported from the yoke frame 204. One end of the crankshaft 210 may be provided with a balancing fly wheel pulley 213, around which a drive belt may extend, the other end of the crankshaft being provided with a friction brake 214. A pair of pitmans 215 are attached at one end thereof to the crankshaft 210, and at the other end thereof to a press member 202 as by means of hinge pins 216.

It is important that the reciprocating movement of the upper unit B be under the immediate control of the operator. A clutch 220 operatively connects the continuously rotating drive wheel 213 to the crankshaft 210. The clutch 220 is engaged by a control bolt 221 supported by a bracket 222 attached to the adjacent supporting standard 203 of the press. The end of the control bolt 221 is normally held in engagement with the clutch 220 by means of a compression spring 223. When the control bolt 221 is in engagement with the clutch 220, the crankshaft 210 does not rotate, and when the control bolt 221 is withdrawn from engagement with the clutch 220, the crankshaft 220 will make one complete revolution and reciprocate the press member 202 one complete stroke. The friction 214 is adjusted to prevent further rotation of the crankshaft 210 when disengaged by the clutch 220 from the drive wheel 213. The lower end of the control bolt 221 is connected to a control rod 224 connected to a foot lever 226, one end of which is pivotally mounted as by hinge bracket 227. A foot pad 228 is attached to the foot lever 226 and is conveniently arranged so that the foot lever 226 may be depressed by the foot of the operator to withdraw the control bolt 221 from engagement with the clutch 220.

To perform the punching and crimping operation, the operator places the panel upon the lower unit B of the mechanism, with the metal face of the panel resting upon the flat top surface of the die block 90, as shown more particularly in Fig. 12. The guide elements 130 are suitably adjusted to retain the panel in proper punching position. Once the guide elements 130 are adjusted, successive panels of the same form and size may be operated upon without further adjustment of these guide elements. The operator then steps on the foot pedal 228 of the foot lever 226, thereby withdrawing the control bolt 221 from engagement with the clutch 220. The drive wheel 213 then will rotate the crankshaft 210 one complete revolution, the operator removing his foot from the footpad 228, so that the control bolt 221 will manipulate the clutch 220, so as to disengage the drive wheel 213 from the crankshaft 210 when the crankshaft 210 has made one complete revolution.

During the initial 180° rotation of the crankshaft 210, the pitmans 215 attached thereto move the press member 202 and the upper unit A moves downwardly until the underside of the stripper plate 46 seats against the upper surface of the base sheet of the panel being operated upon, as shown more particularly in Figs. 13 and 14. The pressure plate 20 continues to move downwardly, compressing the compression springs 51 and causing the head portions 44 of the tubular guide sleeves 43 to telescope upwardly in the cavity 42, provided in the upper punch block segments 40 and the upper corner punch block segments 50, until the head portions 44 strike the collar portion 49', associated with the punch pins 47. It will be noted that the stripper plate 46 firmly presses the panel against the supporting top face of the die block 90 and the upper faces of the lower intermediate die block segments 100 and the lower corner die block segments 110. The punch points 47 of the punch pins 45 move through the intermediate holes 53 and the corner holes 53' in the stripper plate 46 and punch cleanly through the base sheet $w$ and the metal sheet $m$ of the panel, driving the punched-out core $c$ into the die holes 102 in the intermediate die block segments 100 and the lower corner die block segments 110. The successive punched-out cores $c$ are driven by the punch points 47 through the die holes 102 and 112 until discharged through the discharge bores 89 in the lower base plate 80.

When the metal-clad panel is firmly clamped between the stripper plate 46 and the die block 90, and when the die holes 53 in the stripper plate 46 and the die holes 102 and 112 in the die block segments 100 and 110 are accurately formed to snugly receive the punch points 47, it will be found that the punch points 47 will punch clean cut holes in the metal-clad panel without splintering or shattering the base sheet material or tearing or otherwise deforming the metal facing sheet. The various parts of the mechanism are formed and coordinated to punch clean, smooth holes through the metal-clad panel, without formation of burrs or other ragged edges around the hole in the metal sheet and without shattering or otherwise damaging the base sheet material which surrounds the hole which is formed. The lower end of the punch point 47 may be substantially flat, or if desired may be made slightly concave. It will be appreciated that the punch points 47 may be of any desired cross sectional size and contour to form the required size of hole in the metal-clad panel, the die holes 102 and 112 in the die block segments 100 and 110 being at all times formed to snugly receive the punch points.

Simultaneously with the downward movement of the upper pressure plate 20, the upper crimping die 60 moves downwardly so as to press the exposed corner section of the metal sheet against the crimp formation 113, associated with the corner die block segments 110. The crimping die 60 and the crimping die formations 113 are shaped to form crimps and fold lines of the desired length, size and contour in the metal sheet. Thus it will be appreciated that holes are punched in the metal-clad panel and sections of the metal sheets are crimped to the desired contour, all in one downward stroke of the reciprocating member 202 of the press.

As the crankshaft 210 continues its complete revolution, the press member 202 is raised, which raises the pressure plate 20, withdrawing the punch points 47 from the holes punched in the panel and at the same time lifts the upper crimping dies 60 from the crimped areas of the metal sheet. It will be noted, however, that the compression springs 51 retain the stripper plate 46 firmly against the panel until the punch points 47 have been completely withdrawn from the holes formed thereby in the panel. As the press member 202 continues to rise, the stripper plate 46 will be raised off from the panel as indicated in Fig. 12 permitting ready and convenient removal of the punched and crimped panel from the lower unit B of the mechanism, permitting another prepared panel to be placed in position on the lower die block 90. The entire punching and crimping operation can be performed on the metal-clad panel by means of the mechanism above described in the matter of a few seconds.

The upper unit A and the lower unit B, comprising the punching and crimping mechanism, are simple in design and construction and can be readily detached and removed from the base member and the reciprocating member of the mechanical press. In view of the fact that these sections are relatively simple in construction and relatively inexpensive to assemble, such sections can be quickly and inexpensively constructed and assembled in adaptation to the requirements of the panels to be processed and whereby the panels may be punched and crimped on a high speed mass production basis.

By the use of the mechanism above described, metal-clad panels may be punched and crimped with precision and accuracy at high production speeds by relatively untrained operators. Several hundred panels may be punched and crimped per hour by a single operator, without reliance upon skilled craftsmanship to insure accurate and precise workmanship. It will be appreciated that metal-clad panels of almost any desired shape and requiring almost any desired arrangement, location and size of punch holes, openings and crimps, may be punched and crimped by the proper selection and setting of the punching and crimping devices in the punch block and die block.

While certain novel features of the invention have been disclosed herein, and are pointed out in the claims, it will be understood that various omissions, substitutions and changes may be made by those skilled in the art without departing from the spirit of the invention.

What is claimed is:

1. Mechanism for forming predetermined crimps in a corner section of a metal panel sheet including in combination, a base block presenting a supporting face providing a firm support for the panel adjacent the corner section thereof to be crimped, said base block presenting a crimping die face contoured in conformity with the crimp to be formed in the corner section of the metal sheet, a reciprocable pressure block, a pressure plate designed to overlie the areas of the metal sheet which surround the corner section thereof to be crimped, means for resiliently supporting said pressure plate from said pressure block, a die member presenting a die face at one end thereof complementary to the underlying die face associated with said base block, said die member having a head portion designed to have limited telescoping movement in a conforming cavity provided in said pressure block, a compression spring associated with said die member operative to maintain the die face thereof in extended position, said pressure plate having an opening therein aligned with the die face of said base block through which the die face of the adjacent die member may project, and resilient means positioned between said pressure plate and pressure block for normally retaining said pressure plate in extended position operative to exert resilient compressive pressure against the area of said metal sheet surrounding the metal corner section to be crimped to limit the deformation of said metal sheet to the corner area to be crimped.

2. The method of working metal clad panels formed from a fibrous base sheet bonded to a metal facing sheet, and having a corner section of the metal sheet exposed, the steps which include, supporting the metal clad panel upon a die block with the metal facing sheet of the panel in direct contact with the supporting face of the die block, exerting uniform pressure against the exposed face of the base sheet over a substantial area adjacent the marginal areas of the panel to be worked, driving punched pins through said panel in spaced relation around the marginal areas thereof first through the base sheet and then through the metal sheet to form spaced holes extending through the marginal areas of the panel, and substantially simultaneously pressing a crimp in the exposed metal corner section of the panel, said punching and crimping operations being performed while the panel is under compressive pressure surrounding the worked marginal areas thereof.

3. A machine for operating upon metal clad plywood panels, including mechanism for punching a hole through the plywood layer and metal layer of the panel and substantially simultaneously shaping a crimp formation in the exposed corner of the metal sheet constituting a part of said panel, said mechanism including a die block upon which the metal face of the panel may be supported, said die block having a die hole therein and a corner crimping die face on the supporting surface thereof, a punch pin having a punch point mounted to be projected through the plywood layer, the metal sheet layer and the die hole in the die block, a resiliently mounted crimping die having a complementary corner crimping die face mounted over the die face of said die block, a pressure plate designed to overlie the plywood areas of said panel surrounding the portions to be punched, means for resiliently supporting said pressure plate, conforming openings in said pressure plate through which said punching pin and said corner crimping die may project, said pressure plate being operative to exert compressive pressure against the plywood face of said panel in the area surrounding the hole to be formed to prevent undesired deformation of the panel, and means for driving the punch point of said punch pin into the hole in said die block and through the plywood layer and metal sheet layer of the panel supported thereon and to substantially simultaneously press the die face of said corner crimping die against the exposed corner of the metal sheet whereby the exposed corner of the metal sheet is crimped in true conformity with the die faces presented by said die block and crimping die.

GLENN H. NORQUIST.

REFERENCES CITED

The following references are of record in the file of this patent:

UNITED STATES PATENTS

| Number | Name | Date |
|---|---|---|
| 625,789 | Macbeth | May 30, 1899 |
| 1,484,600 | Witte | Feb. 19, 1924 |
| 1,599,792 | Sage | Sept. 14, 1926 |
| 1,612,156 | Small | Dec. 28, 1926 |
| 1,636,111 | Rode | July 19, 1927 |
| 1,914,313 | Wales | June 13, 1933 |
| 1,952,152 | Wilkie | Mar. 27, 1934 |
| 2,108,619 | Smith | Feb. 15, 1938 |
| 2,146,828 | Liss | Feb. 14, 1939 |
| 2,168,377 | Wales | July 8, 1939 |
| 2,276,052 | Lindsay | Mar. 10, 1942 |
| 2,278,288 | Sadler | Mar. 31, 1942 |
| 2,296,136 | Bechtel | Sept. 15, 1942 |
| 2,344,944 | Hurst | Mar. 28, 1944 |
| 2,421,732 | Albert et al. | June 3, 1947 |

FOREIGN PATENTS

| Number | Country | Date |
|---|---|---|
| 6,514 | Great Britain | Mar. 15, 1911 |
| 511,806 | Great Britain | Aug. 24, 1939 |